United States Patent
Huang et al.

(10) Patent No.: US 8,952,935 B2
(45) Date of Patent: Feb. 10, 2015

(54) TOUCH DISPLAY

(75) Inventors: Hsin-Tao Huang, Hsinchu (TW); Chuang-Chuang Tsai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 343 days.

(21) Appl. No.: 13/351,762

(22) Filed: Jan. 17, 2012

(65) Prior Publication Data

US 2012/0262413 A1 Oct. 18, 2012

(30) Foreign Application Priority Data

Apr. 13, 2011 (TW) ............................. 100112746 A (51) Int. Cl.
*G06F 3/041* (2006.01)
*G06F 3/0488* (2013.01)
*G02F 1/1335* (2006.01)

(52) U.S. Cl.
CPC .. *G06F 3/0488* (2013.01); *G02F 2001/133616* (2013.01)
USPC ............... 345/176; 349/63; 359/558

(58) Field of Classification Search
CPC ..... G06F 3/0425; G06F 3/0412; G06F 3/428; G06F 3/0488; G02F 1/133555; G02F 2001/133638; G02F 2001/133616; G02B 6/0053

USPC .......... 345/174, 175, 176; 178/18.09; 349/63; 359/558

See application file for complete search history.

(56) References Cited

U.S. PATENT DOCUMENTS

| | | | |
|---|---|---|---|
| 6,816,214 B1 * | 11/2004 | Ohsumi | 349/65 |
| 7,001,060 B1 * | 2/2006 | Kimura | 362/620 |
| 2002/0145593 A1 * | 10/2002 | Boyd et al. | 345/173 |
| 2002/0145687 A1 * | 10/2002 | Mitsui et al. | 349/113 |
| 2003/0103177 A1 * | 6/2003 | Maeda et al. | 349/113 |
| 2003/0223218 A1 * | 12/2003 | Kawakami | 362/31 |
| 2006/0132453 A1 * | 6/2006 | Boyd et al. | 345/173 |
| 2008/0049154 A1 * | 2/2008 | Abileah et al. | 349/12 |
| 2008/0225506 A1 * | 9/2008 | Huang et al. | 362/19 |
| 2010/0123597 A1 * | 5/2010 | Kitsukawa | 340/825 |
| 2010/0134999 A1 * | 6/2010 | Huang et al. | 362/19 |
| 2011/0090162 A1 * | 4/2011 | Shih | 345/173 |

* cited by examiner

*Primary Examiner* — Michael J Eurice
(74) *Attorney, Agent, or Firm* — Guice Patents PLLC (57) ABSTRACT

A touch display, including: a light source; a light guide plate, having a first refractive index and having a side face close to the light source; a cover layer, having a second refractive index and being placed over the light guide plate, and the second refractive index is smaller than the first refractive index; a plurality of pillar structures, having a third refractive index and being placed under the light guide plate, and the third refractive index is larger than or equal to the first refractive index; a touch structure, placed over the cover layer; and an electronic paper device, placed under the pillar structures.

12 Claims, 8 Drawing Sheets

TOUCH DISPLAY

BACKGROUND OF THE INVENTION

1. Field of the Invention

The present invention relates to a touch display, especially to a touch display having a front light module, which is capable of improving the efficiency in guiding light downward, enhancing the pixel display intensity, and increasing the color saturation when used in color display applications.

2. Description of the Related Art

In the implementation of transflective or reflective touch displays, front light modules of edge-lighting type are commonly utilized for minimizing the size of the touch displays so as to make the touch displays meet the market's form factor demand.

Figure 1:
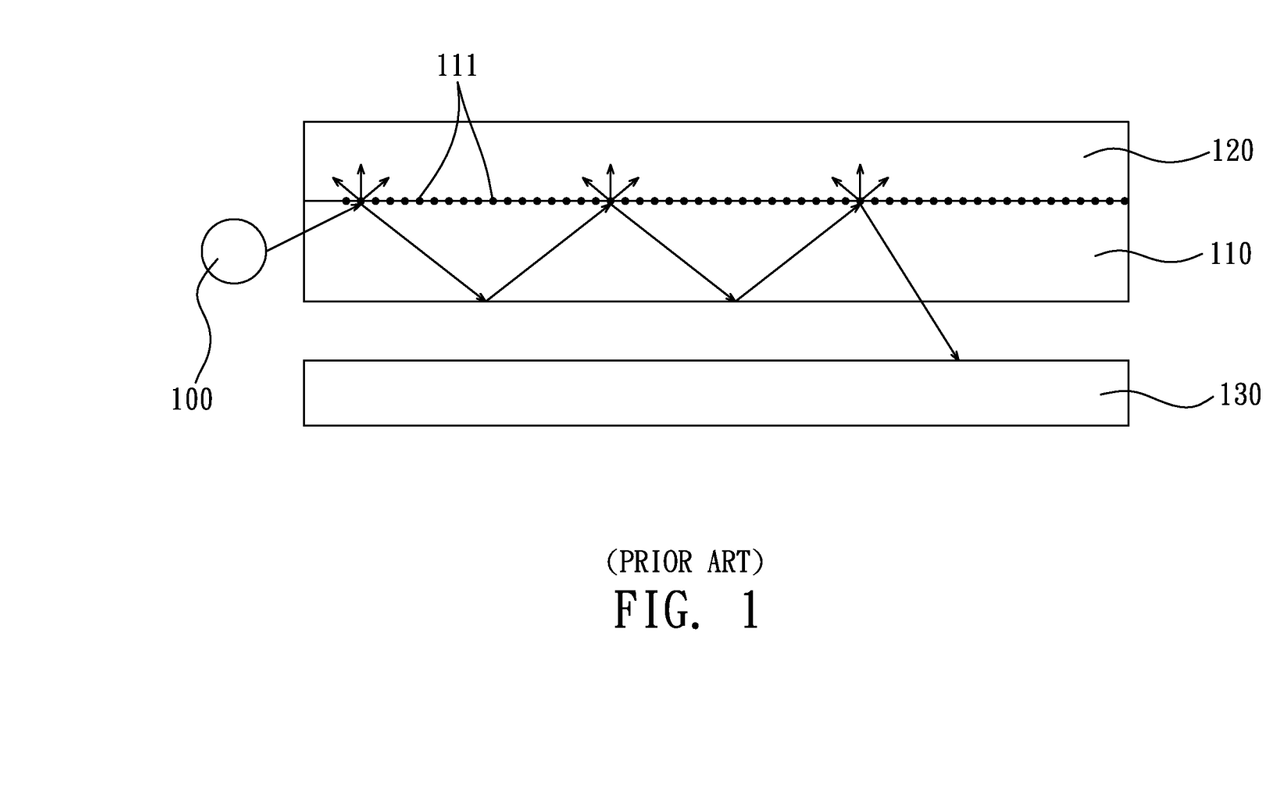
FIG. 1 illustrates a cross sectional view of a reflective type touch display using a typical front light module.

A typical front light module of edge-lighting type generally installs a light-guiding means on the top face of a light guide plate for guiding light downward, so as to transform an edge light to a uniform plane light, which emits light beams downward to provide illumination for a display. Please refer to FIG. 1, which illustrates a cross sectional view of a reflective type touch display using a typical front light module. As illustrated in FIG. 1, the reflective type display reflective type display includes a light source 100, a light guide plate 110, a touch panel 120, and a reflective type display 130.

In the touch display, the light source 100 is used for providing incident light.

The light guide plate 110, of which the left side face is a light entrance surface neighboring the light source 100, the bottom face is a light exit surface, and the top face has a plurality of diffusion points 111, wherein, the incident light hitting the diffusion points 111 indirectly (after going through a total reflection at the bottom face of the light guide plate 110) or directly will be scattered off, and some of the scattered light—of which the traveling direction forms with the normal of the light exit surface an angle smaller than a total reflection angle—will pass through the light exit surface to illuminate the reflective type display 130.

The touch panel 120 generally has a touch structure formed over a transparent glass substrate, and the reflective type display 130 provides a picture by reflecting the light incident thereon.

Although the diffusion points 111 have the advantage of easy implementation (can use sand-blasting process), however, the efficiency in guiding light downward is not good enough—some of the light scattered by the diffusion points 111 will emit away from the top face of the light guide plate 110, causing energy loss.

Figure 2:
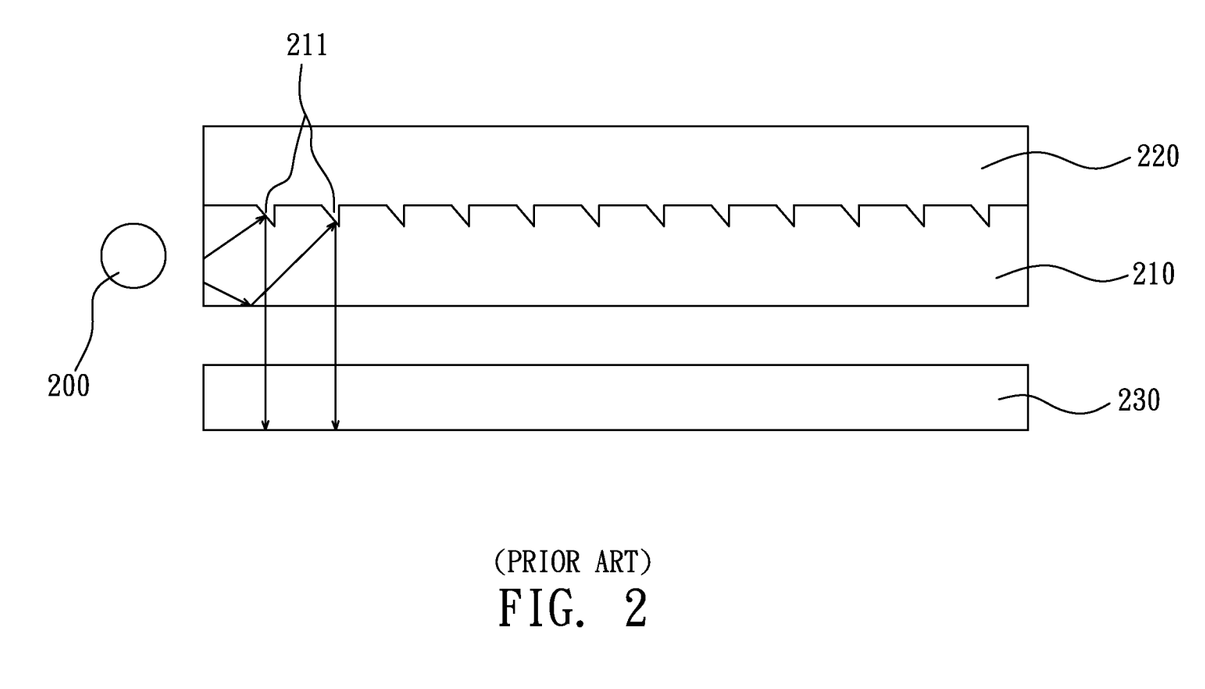
FIG. 2 illustrates a cross sectional view of a reflective type touch display using another typical front light module.

To improve the efficiency in guiding light downward, there is another typical design using microstructure as a means for guiding light downward. Please refer to FIG. 2, which illustrates a cross sectional view of a reflective type touch display using another typical front light module. As illustrated in FIG. 2, the reflective type touch display includes a light source 200, a light guide plate 210, a touch panel 220, and a reflective type display 230.

In the touch display, the light source 200 is used for providing incident light.

The light guide plate 210, of which the left side face is a light entrance surface neighboring the light source 200, the bottom face is a light exit surface, and the top face has a plurality of V type microstructures 211, wherein, the incident light hitting the V type microstructures 211 indirectly (after going through a total reflection at the bottom face of the light guide plate 210) or directly will be reflected to travel down along the normal of the light exit surface to pass through the light exit surface, and therefore illuminate the reflective type display 230.

The touch panel 220 generally has a touch structure formed over a transparent glass substrate, and the reflective type display 230 provides a picture by reflecting the light incident thereon.

Although the V type microstructures 211 can provide better efficiency in guiding light downward, nevertheless, they have the disadvantage of being not easy to implement.

What is more, as the diffusion points 111 of the front light module of FIG. 1 and the V type microstructures 211 of the front light module of FIG. 2 are located at the top face of the light guide plate, therefore they both have the problems of interfering with a user's viewing the display and being subject to getting scratched.

In view of the foregoing problems, the present invention proposes a touch display having a novel structure.

SUMMARY OF THE INVENTION

One objective of the present invention is to disclose a touch display having a front light module, which has a novel structure for guiding light downward more efficiently.

Another objective of the present invention is to disclose a touch display having a front light module, which utilizes an easy-to-implement novel structure for guiding light downward.

Still another objective of the present invention is to disclose a touch display having a front light module, which utilizes a novel structure for guiding light downward without interfering with a user's viewing the display.

Still another objective of the present invention is to disclose a touch display having a front light module, which utilizes a novel structure for guiding light downward, and the novel structure can avoid getting scratched.

Still another objective of the present invention is to disclose a touch display having a front light module, wherein the touch display can possess thin thickness and have low attenuation on display light.

Still another objective of the present invention is to disclose a touch display having a front light module, wherein the display intensity of pixels of the touch display can be enhanced.

Still another objective of the present invention is to disclose a touch display having a front light module, wherein the color saturation can be improved when the touch display is used in color display applications.

To attain the foregoing objectives, an embodiment of the present invention provides a touch display having a front light module, and the touch display includes a touch structure, a light source, a light guide plate, a cover layer, a plurality of pillar structures, and an electronic paper device.

In the touch display, the touch structure is a transparent structure placed over the cover layer, used for detecting a touch event (or touch events).

The light source is capable of emitting an incident light.

The light guide plate has a side face and a bottom surface connected to the side face, and the light guide plate has a first refractive index, the side face neighbors the light source and receives said incident light.

The cover layer has a second refractive index, and the second refractive index is smaller than the first refractive index.

The pillar structures are placed under the bottom surface of the light guide plate and have a third refractive index, and the third refractive index is larger than or equal to the first refractive index.

The electronic paper device is a reflective type or transflective type display device placed under the pillar structures.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 3A:
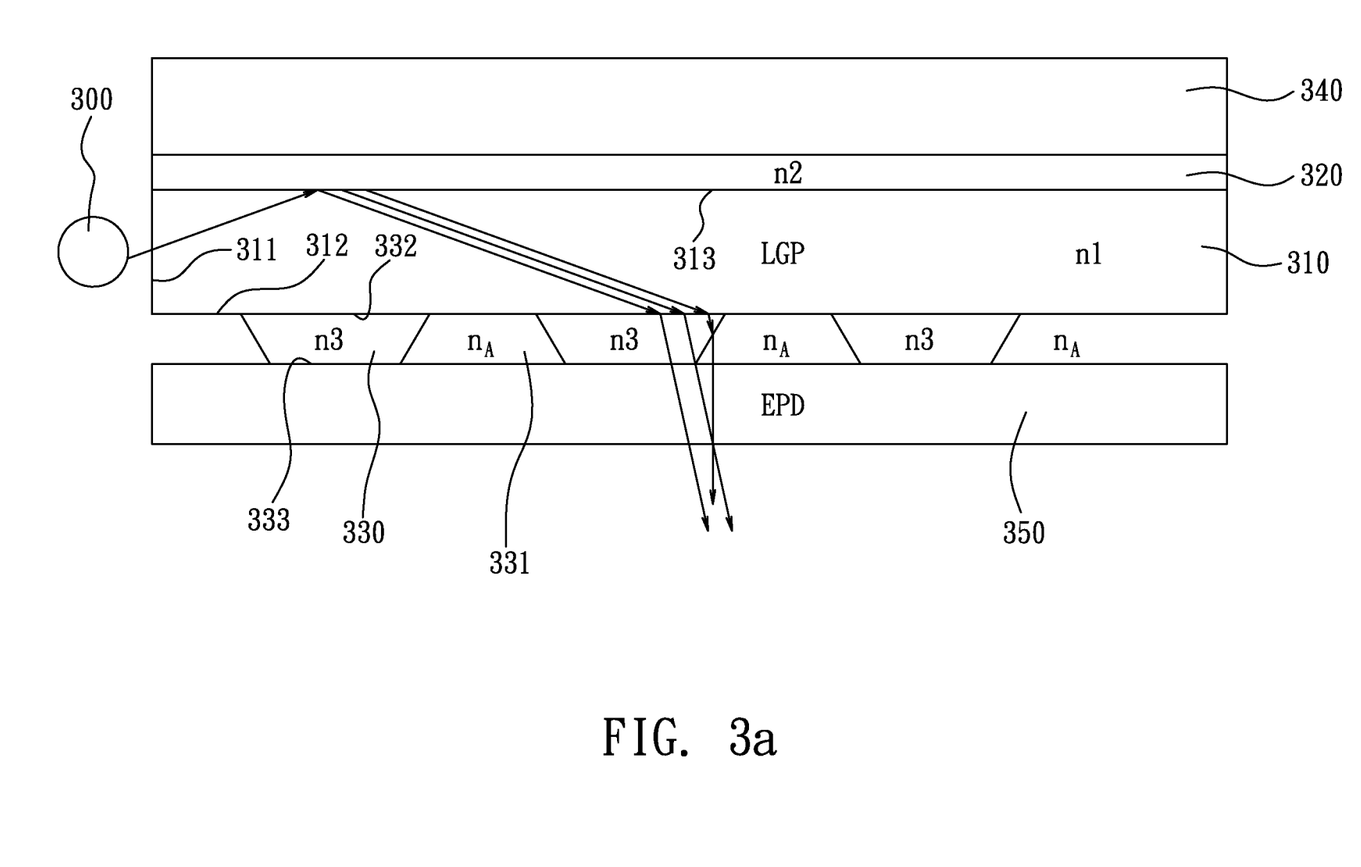
FIG. 3a illustrates a cross sectional view of a touch display having a front light module according to a preferred embodiment of the present invention.

Please refer to FIG. 3a, which illustrates a cross sectional view of a touch display having a front light module according to a preferred embodiment of the present invention. As illustrated in FIG. 3a, the touch display includes a light source 300, a light guide plate 310, a cover layer 320, a plurality of pillar structures 330, a touch structure 340, and an electronic paper device 350.

In the touch display, the light source 300 is used to provide an incident light for the light guide plate 310. The light source 300 can include a fluorescent lamp or a light emitting diode (LED).

The light guide plate 310 has a side face 311 and a bottom surface 312 connected to the side face 311, and the light guide plate 310 has a first refractive index n1 and the side face 311 neighbors the light source 300 and receives the incident light.

The cover layer 320 is made of a transparent material having a second refractive index n2 and is coated over the top face 313 of the light guide plate 310, and the second refractive index n2 is smaller than the first refractive index n1, so as to set a total reflection critical angle of $\sin^{-1}(n2/n1)$ at the top face 313 of the light guide plate 310 to avoid the incident light emitting from the top face 313 of the light guide plate 310.

Figure 3B:
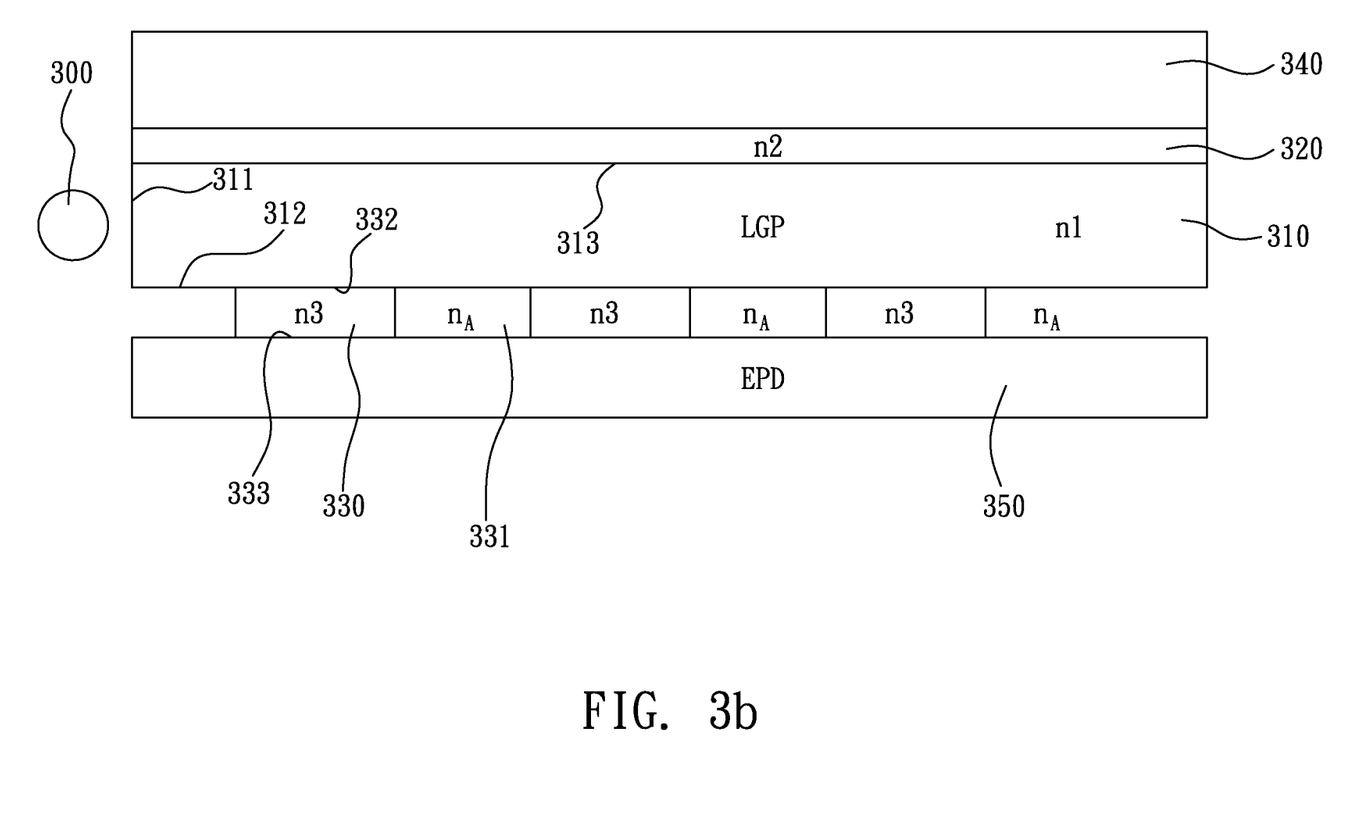
FIG. 3b illustrates a cross sectional view of a touch display having a front light module according to another preferred embodiment of the present invention.
Figure 3C:
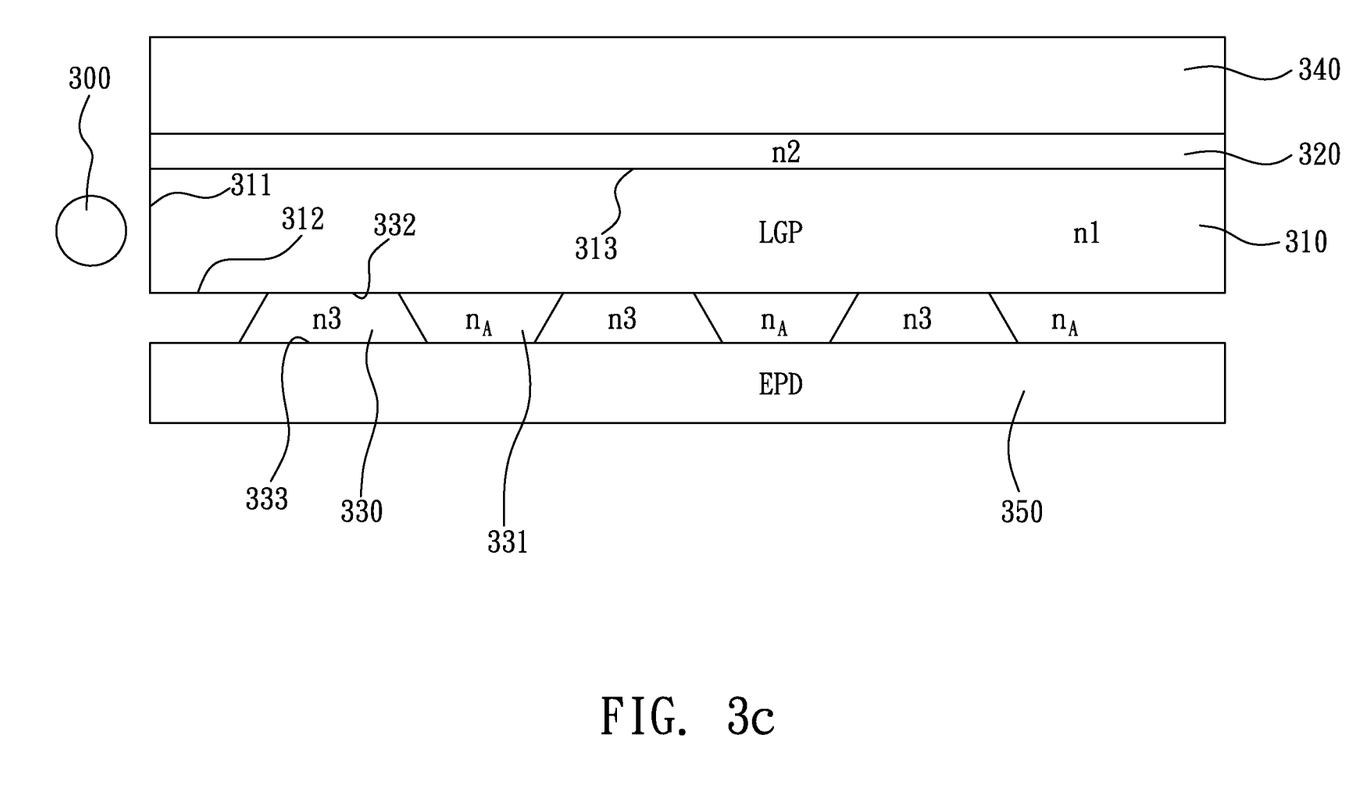
FIG. 3c illustrates a cross sectional view of a touch display having a front light module according to still another preferred embodiment of the present invention.

The pillar structures 330 are placed under the bottom surface 312 of the light guide plate 310 and made of a transparent material having a third refractive index n3, and can be attached to the bottom surface 312 of the light guide plate 310 by using a screen printing process. The third refractive index n3 is larger than or equal to the first refractive index n1, so that the light travelling in the light guide plate 310 can be diverted downward when incident on the pillar structures 330. In addition, there are a plurality of gaps 331—having the refractive index $n_4$ (=1)—among the pillar structures 330 for causing the incident light totally reflected to travel right-upward. With the arrangement of the pillar structures 330 and the gaps 331, not only the light intensity on right side of the light guide plate 310 can be enhanced, but also the efficiency in guiding light downward of the light guide plate 310 can be improved, thereby providing a uniform plane light for the electronic paper device 350. Although each of the pillar structures 330 illustrated in this embodiment has a top face 332 and a bottom face 333 opposite to the top face 332, and the area of the top face 332 is larger than that of the bottom face 333, actually other shapes can also be used. For example, each of the pillar structures 330 illustrated in FIG. 3b has the area of the top face 332 equal to that of the bottom face 333, while each of the pillar structures 330 illustrated in FIG. 3c has the area of the top face 332 smaller than that of the bottom face 333.

Figure 4:
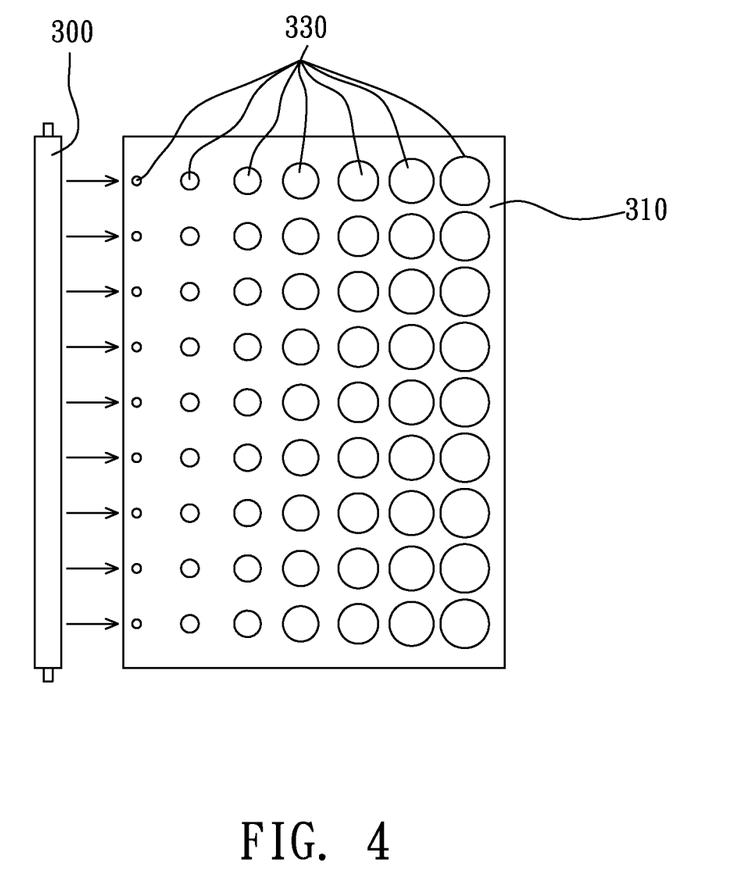
FIG. 4 illustrates a bottom view of the pillar structures of a touch display having a front light module according to still another preferred embodiment of the present invention.
Figure 5:
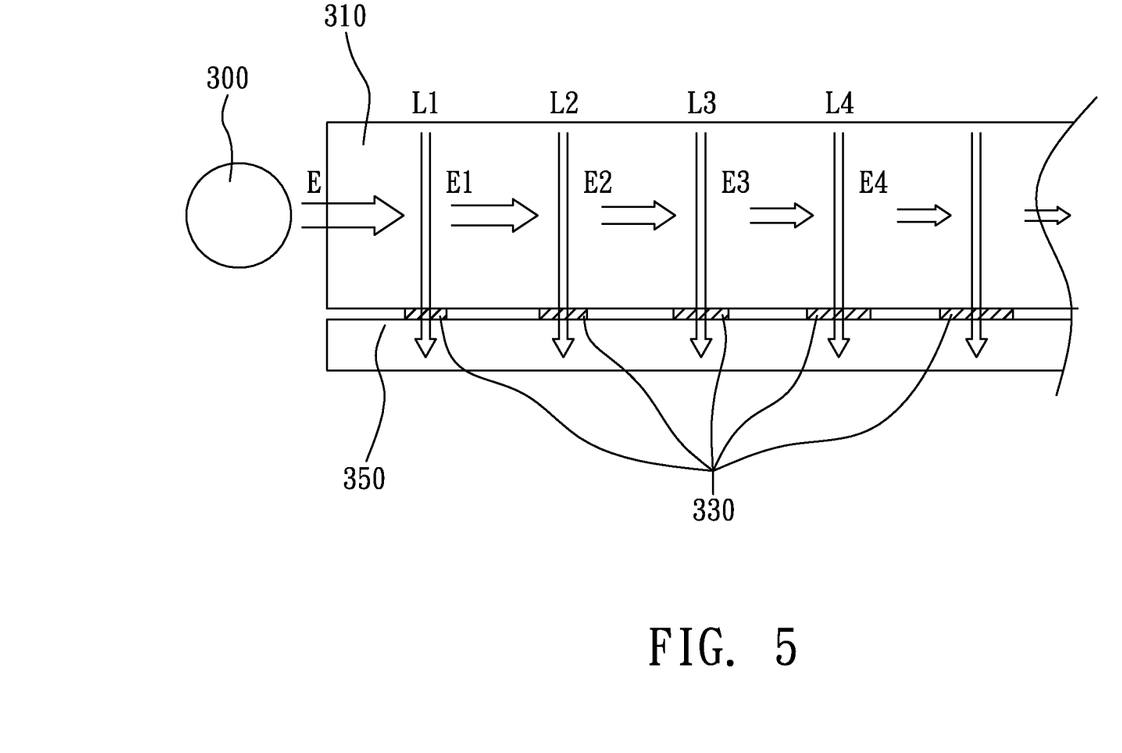
FIG. 5 illustrates the process of the incident light guided downward by the front light module of FIG. 4.

Besides, by arranging the distribution of the pillar structures 330 in a certain way can further improve the uniformity of the plane light. Please refer to FIG. 4, which illustrates a bottom view of the pillar structures 330 of a touch display having a front light module according to still another preferred embodiment of the present invention. As illustrated in FIG. 4, each pillar structure 330 is located a first distance from the light source 300, and the area of the top face of each the pillar structure 330 varies with the first distance—the farer the first distance, the larger the area of the top face. Besides, a gap is formed between two neighboring ones of the pillar structures 300 and located a second distance from the light source 300, and the gap varies with the second distance—the gap becomes smaller as the second distance increases. With this arrangement, the ratio of the downward guided light to the totally reflected light at the bottom face 312 of the light guide plate 310 will vary with the distance between the pillar structure 330 and the light source 300—the farer the distance, the larger the ratio, so as to adjust the intensity distribution of the downward guided light over the bottom face 312 of the light guide plate 310 to provide a uniform plane light. The process of the incident light guided downward by the front light module of FIG. 4 is illustrated in FIG. 5. As can be seen in FIG. 5 that E>E1>E2>E3>E4, i.e., an incident light E has a decaying effect during the travelling process; and the distribution of the pillar structures 330—with the area of the top face 332 of the pillar structure 330 increasing gradually—compensates the decaying effect and results in uniform light beams (L1、L2、L3、L4) going downward, making L1≈L2≈L3≈L4.

The touch structure 340 is a transparent structure placed over the cover layer 320, used for detecting a touch event (or touch events). The touch structure 340 can be of resistive type, capacitive type, surface acoustic wave type, or force sensing type.

In addition, the bottom faces 332 of the pillar structures 330 can be adhered to the electronic paper device 350 by a glue material, and the electronic paper device 350 can be a reflective type or transflective type display device, for example but not limited to electrophoresis display, MEMS (micro electro mechanical system) display, cholesteric liquid crystal display, electrowetting display, liquid crystal display, organic/inorganic electroluminescence display, or electrochromic display.

Figure 6:
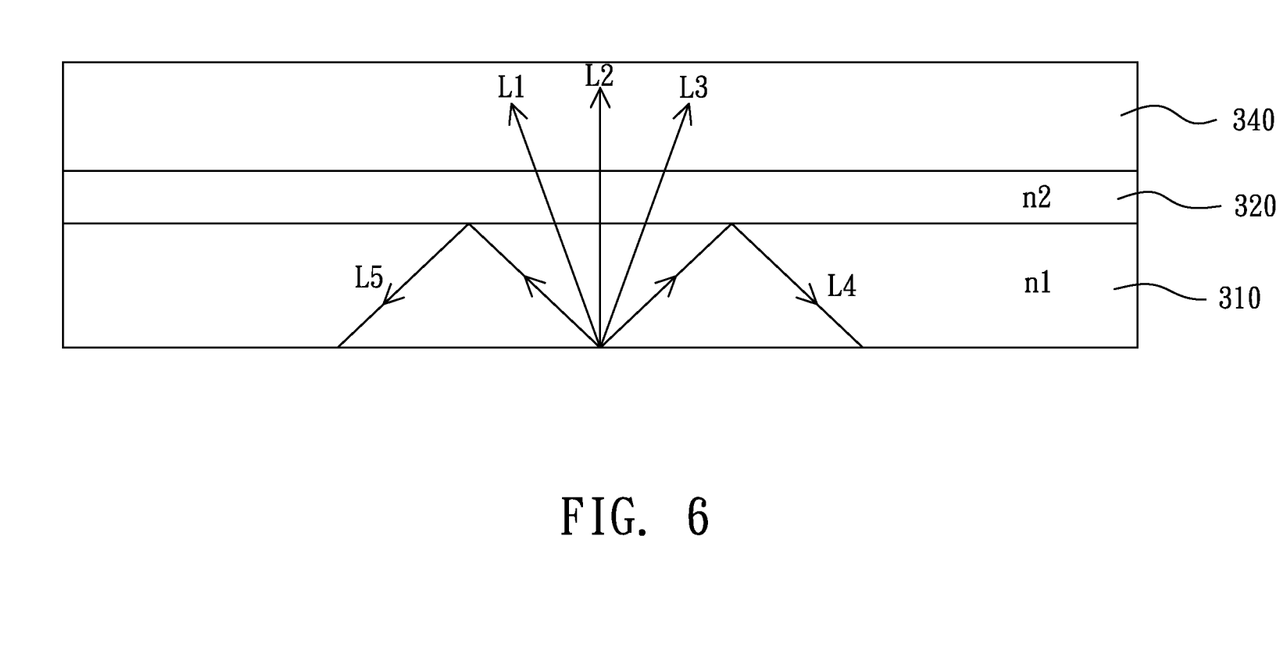
FIG. 6 illustrates how the light beams reflected by a pixel are concentrated through the effect of a cover layer.

Further, through the effect of the cover layer 320, the light beams reflected by any of the pixels can be concentrated to provide high pixel display intensity, and thereby high color saturation if a color display is used. Please refer to FIG. 6, which illustrates how the light beams reflected by a pixel are concentrated through the effect of the cover layer 320. As illustrated in FIG. 6, the light beams L1, L2, L3—forming with the normal of the cover layer 320 three angles, which are smaller than a total reflection critical angle (=$\sin^{-1}$(n2/n1))—pass through the cover layer 320, while the light beams L4, L5—forming with the normal of the cover layer 320 two angles, which are larger than the total reflection critical angle (=$\sin^{-1}$(n2/n1))—are reflected. As a result, the present invention not only can improve the pixel display intensity, but also can prevent the interference among monochromes of R, G, B, and thereby increase color saturation when a color display is used.

Besides, as the light guide plate 310 not only can be used in light guiding, but also can serve as a touch glass substrate, therefore, the touch display of the present invention can possess thin thickness and provide low display light attenuation by removing the touch glass substrate.

In conclusion, the touch display having a front light module of the present invention can improve the efficiency in guiding light downward through the effect of the novel pillar structures. The pillar structures, being placed under a light guide plate, not only can be implemented by common manufacture processes, but also have the advantages of avoiding interfering with a user's viewing the display and preventing getting scratched. Besides, the cover layer of the present invention not only can improve the pixel display intensity, but also can increase color saturation when a color display is used. What is more, as the light guide plate of the present invention can also serve as a touch glass substrate, therefore, the touch display of the present invention can possess low thickness and provide low attenuation on display light. As a result, the present invention possesses superior advantages.

While the invention has been described by way of example and in terms of a preferred embodiments, it is to be understood that the invention is not limited thereto. To the contrary, it is intended to cover various modifications and similar arrangements and procedures—for example, the cover layer 320 can include a plurality of air gaps, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A touch display, comprising:
   a light source, being capable of emitting an incident light;
   a light guide plate, having a side face and a bottom surface connected to said side face, wherein said light guide plate has a first refractive index and said side face neighbors said light source and receives said incident light;
   a cover layer, having a second refractive index and being placed over said light guide plate, wherein said second refractive index of said cover layer is smaller than said first refractive index of said light guide plate;
   a plurality of pillar structures, having a third refractive index and being placed under said bottom surface of said light guide plate, wherein said third refractive index of said plurality of pillar structures is larger than or equal to said first refractive index of said light guide plate;
   a touch structure, placed over said cover layer; and
   an electronic paper device, placed under said pillar structures;
   wherein said cover layer is located between said touch structure and said light guide plate and said plurality of pillar structures are located between said light guide plate and said electronic paper device.

2. The touch display as claim 1, wherein said light source comprises a device selected from a group consisting of a fluorescent lamp and a light emitting diode.

3. The touch display as claim 1, wherein said cover layer comprises a plurality of air gaps.

4. The touch display as claim 1, wherein each said pillar structure has a top face and a bottom face opposite to the top face, and the area of said top face is larger than that of said bottom face.

5. The touch display as claim 1, wherein each said pillar structure has a top face and a bottom face opposite to the top face, and the area of said top face is equal to that of said bottom face.

6. The touch display as claim 1, wherein each said pillar structure has a top face and a bottom face opposite to the top face, and the area of said top face is smaller than that of said bottom face.

7. The touch display as claim 1, wherein said touch structure is of one type selected from the group consisting of resistive type, capacitive type, surface acoustic wave type, and force sensing type.

8. The touch display as claim 1, wherein each said pillar structure is located a first distance from said light source, an area of an top face of each said pillar structure varies with said first distance, and said area becomes larger as said first distance increases.

9. The touch display as claim 8, wherein a gap is formed between two neighboring ones of said pillar structures and located a second distance from said light source, said gap varies with said second distance, and said gap becomes smaller as said second distance increases.

10. The touch display as claim 1, wherein said electronic paper device is adhered to said pillar structures by a glue material.

11. The touch display as claim 10, wherein said electronic paper device is a device selected from a group consisting of a reflective type display device and a transflective type display device.

12. The touch display as claim 10, wherein said electronic paper device is one selected from the group consisting of electrophoresis display, MEMS (micro electro mechanical system) display, cholesteric liquid crystal display, electrowetting display, liquid crystal display, organic/inorganic electroluminescence display, and electrochromic display.

* * * * *